United States Patent

Nagatake et al.

[11] Patent Number: 5,231,503
[45] Date of Patent: Jul. 27, 1993

[54] IMAGE SENSOR APPARATUS WITH NOISE CANCELLATION CIRCUITRY

[75] Inventors: Youichi Nagatake; Kouichi Matsumoto; Kazuo Yamamoto; Koichi Kitamura, all of Tokyo, Japan

[73] Assignee: Nippon Steel Corporation, Japan

[21] Appl. No.: 735,526

[22] Filed: Jul. 26, 1991

[30] Foreign Application Priority Data

Jul. 26, 1990 [JP] Japan .................................. 2-199493
Aug. 20, 1990 [JP] Japan .................................. 2-219743

[51] Int. Cl.$^5$ ........................ H04N 3/14; H04N 5/335
[52] U.S. Cl. ........................... 358/213.15; 358/213.16
[58] Field of Search ............ 358/213.15, 483, 213.11, 358/213.16, 167

[56] References Cited

U.S. PATENT DOCUMENTS

| 4,167,755 | 9/1979 | Nagumo | 358/213.15 |
| 4,293,877 | 10/1981 | Tsunekawa et al. | 358/213.16 |
| 4,503,467 | 3/1985 | Ida et al. | 358/213.16 |
| 4,511,804 | 4/1985 | Ozawa | 358/213.15 |
| 4,785,353 | 11/1988 | Seim | 358/213.15 |
| 4,802,012 | 1/1989 | Nobue et al. | 358/213.15 |
| 4,914,519 | 3/1990 | Hashimoto et al. | 358/213.15 |
| 4,992,876 | 2/1991 | Nishizawa et al. | 358/213.15 |

Primary Examiner—Michael T. Razavi
Assistant Examiner—Wendy R. Greening
Attorney, Agent, or Firm—Steven M. Rabin

[57] ABSTRACT

An image sensor apparatus includes a matrix array of optical/electrical conversion elements, switching elements for taking out electric charge stored on the conversion elements, and drive circuits for driving the switching elements thereby to take out image signals from the conversion elements in parallel. A matrix array of noise signal retaining circuits is provided on output sides of the conversion elements for temporarily retaining in parallel, as noise signals, signals produced while the optical/electrical conversion elements are not being driven. Subtracting circuits are provided for subtracting from the parallel image signals in parallel the noise signals retained in the noise signal retaining circuits. A multiplexer converts the parallel output signals from the subtracting circuits into a serial signal in a predetermined sequence. Thus, the image sensor apparatus temporarily retains in parallel the parallel noise signals produced as a result of fluctuations in the characteristics of circuit elements, and cancels out with the subtracting circuits substantially the same noise which is contained in the image signals output from the conversion elements.

5 Claims, 5 Drawing Sheets

IMAGE SENSOR APPARATUS WITH NOISE CANCELLATION CIRCUITRY

BACKGROUND OF THE INVENTION

1. Field of the Invention

The present invention relates to an image sensor apparatus with noise cancellation circuitry suitable for use in facsimile equipment, a compact type image reader, or the like.

2. Description of the Related Art

An image sensor apparatus obtains an image signal by converting an optical signal from an original into an electrical signal by means of a large number of linearly arranged optical/electrical conversion elements. In the conventional image sensor apparatus, there has been such a difficulty that various unwanted signals, e.g., a noise signal produced when a switch is operated, cause deterioration in the S/N ratio of the image signal to thereby make it impossible to obtain an image of high quality.

In U.S. Pat. No. 4,600,843, there is disclosed a method to reduce noises in an image sensor. The method disclosed therein, however, is used in an arrangement in which the output signals of optical/electrical conversion elements are serially taken out, and the patent specification does not refer to reduction of noise signals in such an image sensor apparatus in which optical/electrical conversion elements are connected to form a matrix array and its output portion is formed of a plurality of signal lines, for example, of 32 channels, and image signals are taken out in parallel.

SUMMARY OF THE INVENTION

The present invention was made in view of the above-described problem. Accordingly, an object of the present invention is to provide an image sensor apparatus capable of easily removing noise from parallel output signals from optical/electrical conversion elements connected to form a matrix array.

In order to achieve the above-mentioned object, the present invention in its first aspect provides an image sensor apparatus which comprises a plurality of optical/electrical conversion elements for reading an original, connected to form a matrix array, switching elements provided for each of the optical/electrical conversion elements for taking out electric charges stored on the optical/electrical conversion elements, driving means for driving the plurality of switching elements thereby taking out parallel output signals from the optical/electrical conversion elements, noise signal retaining means provided on the output side of the optical/electrical conversion elements, connected to form a matrix array for temporarily retaining as noise signals the parallel output signals produced while the optical/electrical conversion elements are not being driven, with these signals remaining in parallel, subtracting means for subtracting the parallel noise signals retained in the noise signal retaining means from the parallel output signals of the optical/electrical conversion elements, and means for turning the parallel output signals of the subtracting means into a series signal in predetermined sequence.

In order to achieve the above mentioned object, the present invention in its second aspect provides an image sensor apparatus which comprises a plurality of optical/electrical conversion elements for reading an original, connected to form a matrix array, switching elements provided for each of the optical/electrical conversion elements for taking out electric charges stored on the optical/electrical conversion elements, driving means for driving the plurality of switching elements thereby taking out parallel output signals from the optical/electrical conversion elements, first signal retaining means for temporarily retaining the parallel output signals from the optical/electrical conversion elements, with these signals remaining in parallel, noise signal retaining means provided on the output side of the optical/electrical conversion elements, connected to form a matrix array for temporarily retaining as noise signals the parallel output signals produced while the optical/electrical conversion elements are not being driven, with these signals remaining in parallel, subtracting means for subtracting the parallel noise signals retained in the noise signal retaining means from the parallel output signals in the first signal retaining means, second signal retaining means for temporarily retaining the parallel output signals from the subtracting means, with these signals remaining in parallel, and means for turning the parallel output signals from the second signal retaining means into a serial signal in predetermined sequence.

Parallel noise signals superposed on parallel output signals from optical/electrical conversion elements, when such noise signals are those resulting from the circuit elements of signal processing circuits for processing parallel output signals, are generated to be basically at the same level no matter whether there are image signals from an original or not. Accordingly, if it is arranged such that the signal processing circuits in the rearward stage of the optical/electrical conversion elements are operated immediately before the reading of an original is started, or a black original is read so that dark signals are produced to be stored in noise signal retaining means, then, parallel noise signals generated when there are no image signals can be retained in the noise signal retaining means. Then, upon obtaining output signals by reading the original, if the above noise signals are subtracted from the above output signals in subtracting means, the thus obtained difference signals become parallel output signals rendered free from noise due to such factors as fluctuations in characteristics between parallel arrangement of various circuit elements. The parallel output signals are turned into a serial output signal in predetermined sequence.

According to the above-described first and second aspects of the present invention, parallel noise signals produced due to fluctuations in characteristics of circuit elements or the like can be easily removed from parallel output signals of optical/electrical conversion elements by the use of noise signal retaining means and subtracting means, and thus, an image sensor apparatus capable of producing a high quality image is attained.

DESCRIPTION OF THE PREFERRED EMBODIMENTS

An embodiment of the present invention will be described below with reference to the accompanying drawings.

Figure 3A:
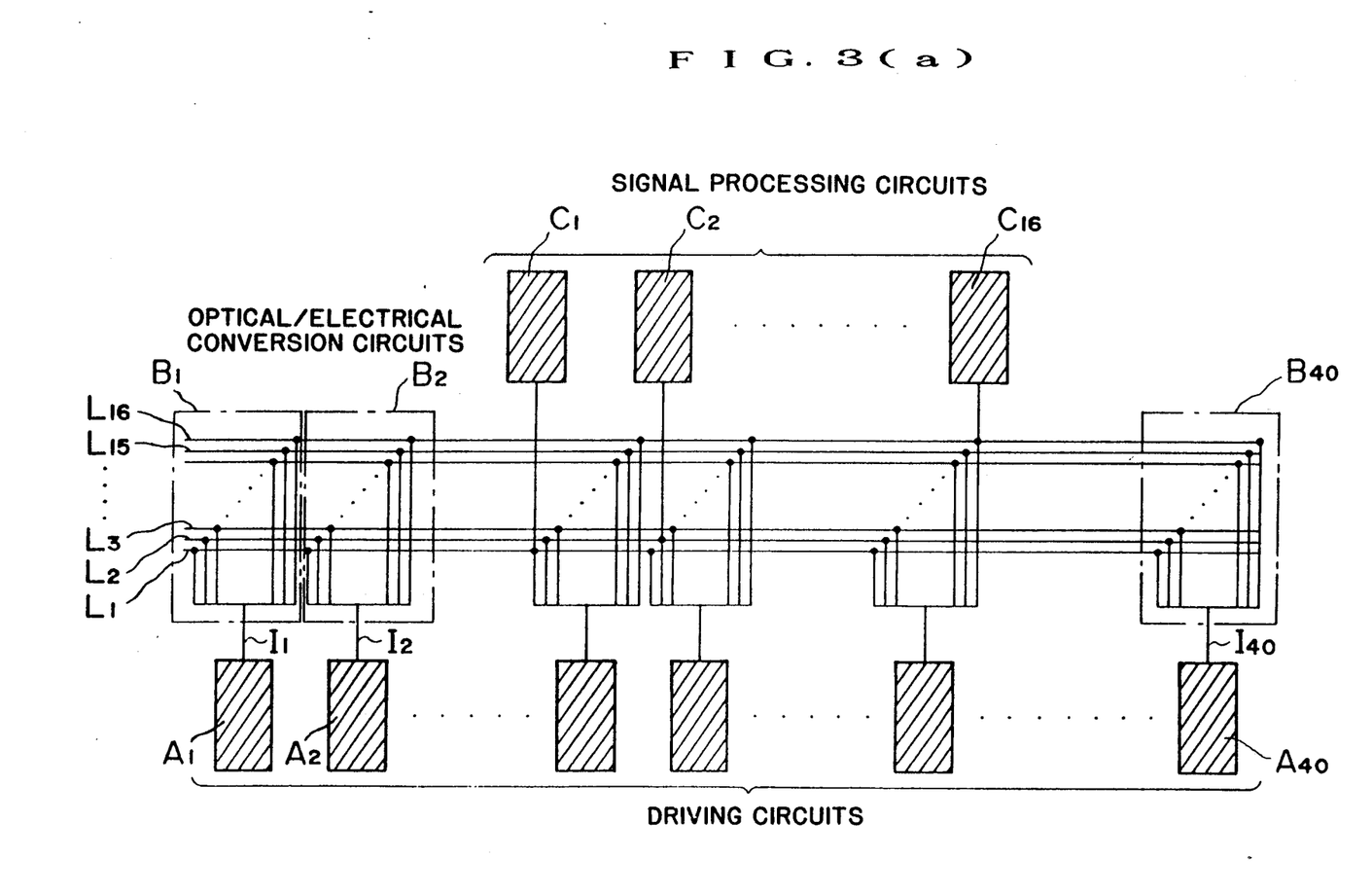
FIG. 3(a) and FIG. 3(b) are circuit diagrams of image sensor apparatus with optical/electrical conversion elements connected to form a matrix array.

As shown in FIG. 3(a), the image sensor apparatus according to the present invention comprises driving circuits $A_1$ to $A_{40}$, optical/electrical conversion circuits $B_1$ to $B_{40}$, and signal processing circuits $C_1$ to $C_{16}$. Further, there are provided 16 output lines $L_1$ to $L_{16}$ corresponding to the signal processing circuits $C_1$ to $C_{16}$. The signal processing circuits $C_1$ to $C_{16}$ corresponding to the circuits shown in FIG. 1 and represents the case of FIG. 1 where the number n of the output channels is 16. Each of the optical/electrical conversion circuits $B_1$ to $B_{40}$ is formed of 16 pairs of a photodiode 10 as the optical/electrical conversion element and a blocking diode 12 as a switching element, and each of the 16 photodiodes is connected with a separate corresponding one of the lines $L_1$ to $L_{16}$. Accordingly, each line has 40 photodiodes corresponding, in number, to the optical/electrical conversion circuits connected thereto.

When an original is irradiated by light, electric charges produced by optical/electrical conversion are stored on the photodiode 10. If, now, a driving pulse is supplied from one driving circuit $A_1$ to the blocking diodes 12 of the corresponding optical/electrical conversion circuit $B_1$, the electric charges stored on the photodiodes 10 are supplied as image signals to the signal processing circuits $C_1$ to $C_{16}$ through output lines $L_1$ to $L_{16}$ in parallel. When processing of the image signals in the optical/electrical conversion circuit $B_1$ has been finished, a driving pulse from the next driving circuit $A_2$ is supplied to the blocking diodes 12 of the corresponding optical/electrical conversion circuit $B_2$ and, as with the optical/electrical conversion circuit $B_1$, image signals are supplied to the signal processing circuits $C_1$ to $C_{16}$ in parallel. Thereafter, similar operations are performed until the driving circuit $A_{40}$ does its operation, whereby image signals from all the optical/electrical conversion circuits $B_1$ to $B_{40}$ can be obtained.

In the present invention, while the photodiode 10 and the blocking diode 12 forming each pair are serially connected, 640 pairs of the elements are connected to form a matrix array, as shown in FIG. 3(a), by 16 lines $L_1$ to $L_{16}$ on the output side arranged in the horizontal direction in the drawing and 40 input lines $I_1$ to $I_{40}$ on the input side arranged in the vertical direction in the drawing. By virtue of the arrangement of the photodiodes connected to form such matrix array, only by having a driving pulse issued, for example, from one driving circuit $A_1$ through the line $I_1$, parallel output signals from 16 photodiodes 10 can be taken out to the signal processing circuits $C_1$ to $C_{16}$ through the lines $L_1$ to $L_{16}$ on the output side. Further, only by 40 driving circuit $A_1$ to $A_{40}$ and 16 signal processing circuits $C_1$ to $C_{16}$, all of the 640 photodiodes 10 can be driven to provide signals. The arrangement of the photodiodes connected to form a matrix as described above have advantages over the conventional arrangement which takes out a serial signal from photodiodes that the output signal can be taken out faster from the photodiodes and the apparatus can be made up of smaller numbers of driving circuits and signal processing circuits.

The circuits of FIG. 1 constituting the key part of the present invention will be described below. The circuits correspond to the signal processing circuits $C_1$ to $C_{16}$ (n=16) in FIG. 3(a). When the signal processing circuits $C_1$ to $C_n$ are fabricated in the form of an IC, it is difficult to make the characteristics of all the elements uniform because the characteristics of the elements vary when arranged in the form of an IC even if the same elements are used. It is therefore inevitable that the characteristics of the elements of the output channels of the signal processing circuits $C_1$ to $C_n$ fluctuate. The fluctuations in noise level among the output channels of the signal processing circuits $C_1$ to $C_n$ will, when the image signals first taken out from all the output channels of the signal processing circuits $C_1$ to $C_n$ in parallel are then serially taken out in succession, lead to a noise whose level varies at intervals of a period corresponding to the number of the output channels (16 in the present case), and, if once the signals are serially taken out, it becomes very difficult to reduce the noise. That is, such noise must be reduced while the signals are being delivered in parallel. The input offset voltage of the integrating circuit, the output offset voltage of the preamplifier, etc. are representative causes of the described fluctuations. Further, since the noise in the input offset voltage of the integrating circuit or the noise in the output offset voltage of the preamplifier is integrated in the integrating circuit in the subsequent stage, the noise becomes greater with time and appears at the output of the integrating circuit, whereby the S/N ratio of the image signals is deteriorated.

Before an actual reading operation is started by the optical/electrical conversion elements in the circuit as shown in FIG. 3(a), the preamplifiers $16_1$ to $16_n$, integrating circuits $18_1$ to $18_n$, and sample-and-hold circuits (noise signal retaining means) $20_1$ to $20_n$ for noise cancellation are operated, so that the parallel noise signals produced while the optical/electrical conversion elements are not being driven (while the image signals are not being read) are temporarily retained in the sample-and-hold circuits $20_1$ to $20_n$, with these noise signals remaining in the parallel state. The noise signals include the above described fluctuations among the output channels. As a particular method to perform the above-described operation, a driving signal for operating the circuit of FIG. 1 may, for example, be supplied thereto separately from the driving pulse of the circuit of FIG. 3(a). Thereby, the parallel noise signals, produced before the optical/electrical conversion elements start reading the image signal, are integrated by the integrating circuits $18_1$ to $18_n$ and stored in the sample-and-hold circuits $20_1$ to $20_n$.

Figure 1:
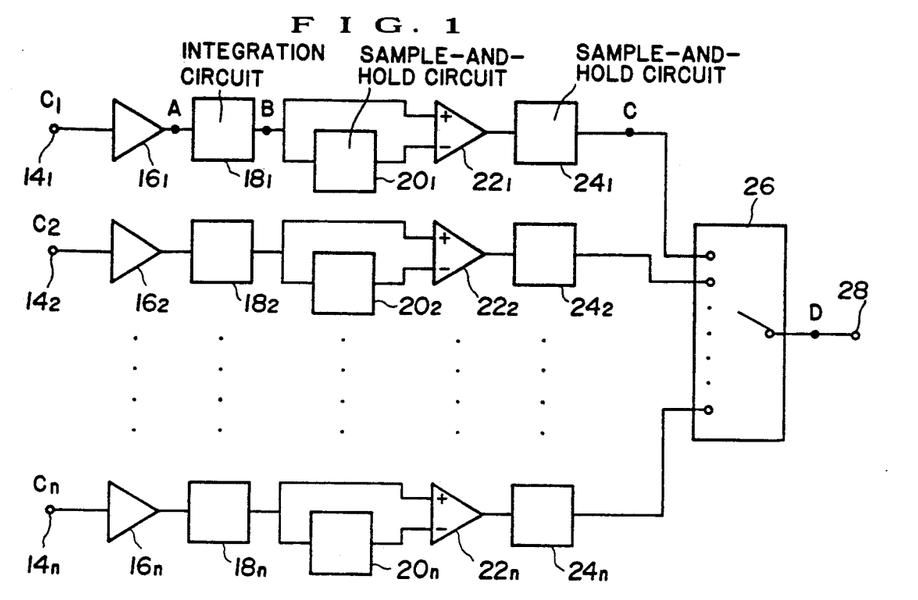
FIG. 1 is a circuit diagram of a signal processing circuit of an image sensor apparatus according to an embodiment of the present invention.

By causing the circuit of FIG. 3(a) to take out the image successively to the above described operation, the obtained image signals are supplied in parallel to the input terminals $14_1$ to $14_n$ of the signal processing circuits shown in FIG. 1. These signals are amplified by the preamplifiers $16_1$ to $16_n$ and, further, integrated by the integrating circuits (first signal retaining means) $18_1$ to $18_n$. The integrated signals are supplied to the positive terminals of subtracting circuits $22_1$ to $22_n$, while the other (negative) terminals are supplied with the values retained in the sample-and-hold circuits $20_1$ to $20_n$ for noise cancellation. Here, the subtracting circuits $22_1$ to $22_n$ subtract the values retained in the sample-and-hold circuits $20_1$ to $20_n$ for noise cancellation from the respective image signals. Since the noise components in the output channels superposed on the image signals, and the noise values retained in the sample-and-hold circuits $20_1$ to $20_n$ in the corresponding output channels, are virtually equal, the noise special to each of the output channels are subtracted from the image signals from each of the output channels, whereby noise components are removed in the image signals from all the output channels.

The signals from which the noise has been removed are retained in sample-and-hold circuits $24_1$ to $24_n$ as separate, second signal retaining means, for a predetermined period of time and also supplied to a multiplexer 26. The multiplexer 26 electrically switches the signals input thereto to output them in predetermined sequence from its output terminal 28. In the image signal thus taken out as a serial signal from the output terminal 28, there are present no noise components which differ among the different output channels and, hence, there appear no changes in concentration in the obtained image at intervals of a period corresponding to the number of the output channels.

It is preferable to perform the retaining operation on the noise signal proper as described above every time the image is read. This is because the noise level drifts due to change in the ambient temperature and the temperature of the body the image sensor apparatus itself. Accordingly, by designing the signal processing circuits such that a driving signal is independently supplied to the signal processing circuits before the driving pulse is supplied to the blocking diodes, noise removal is performed each time the apparatus performs reading operation (when reading is made in each scanning direction), and an image of higher quality can be obtained.

Figure 3B:
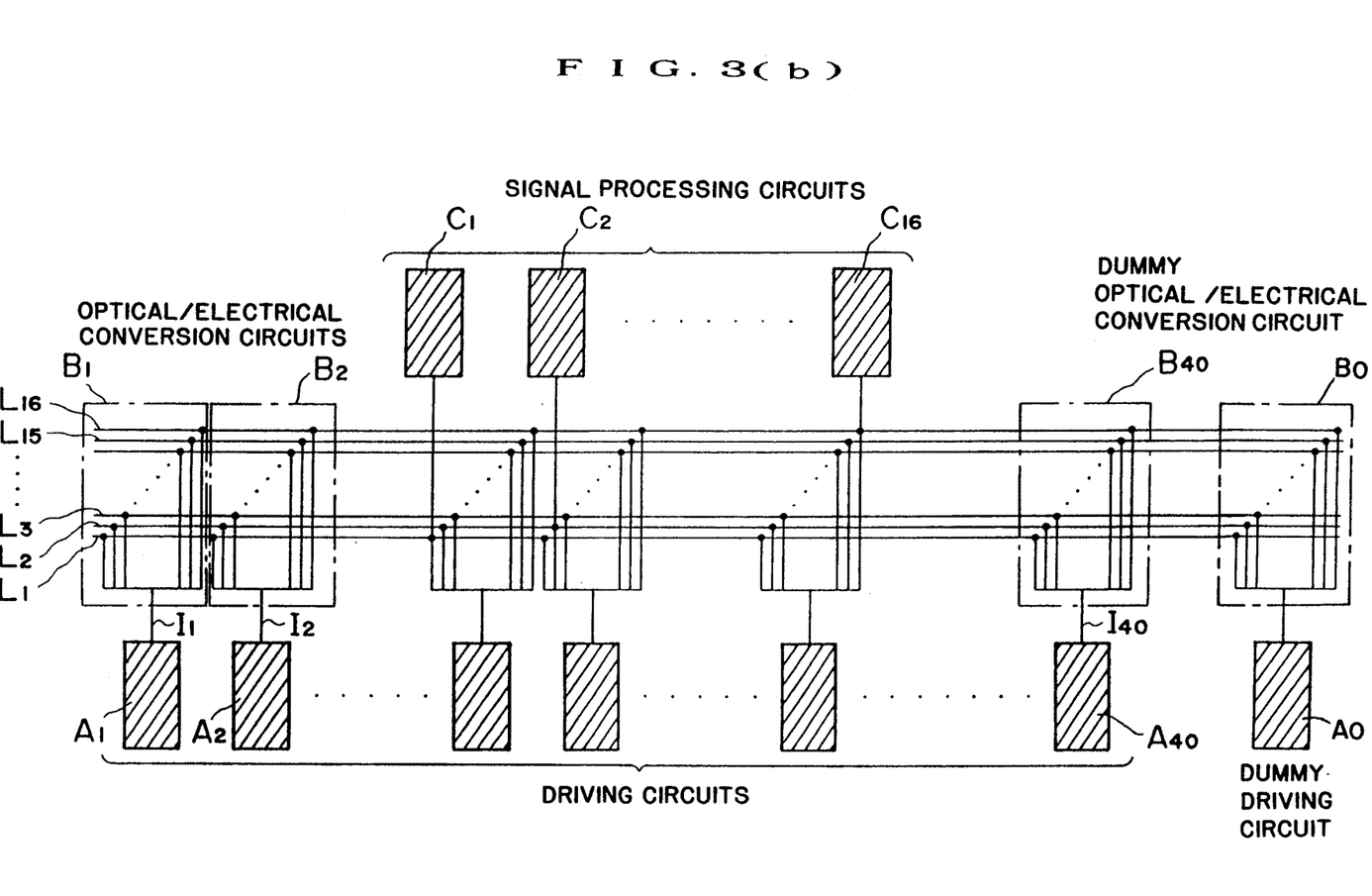
Figure 4:
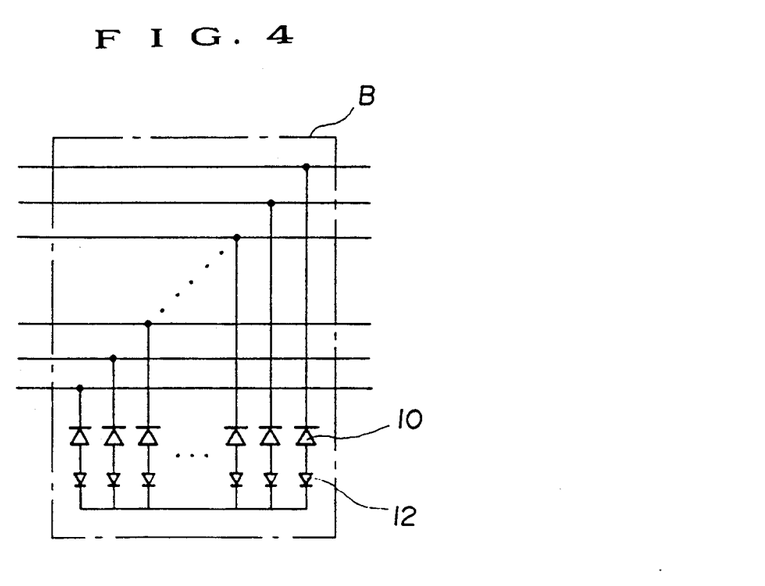
FIG. 4 is a detailed circuit diagram of optical/electrical conversion circuits in the above.

As another method, one block each of the driving circuit and the optical/electrical conversion circuits shown in FIG. 3(a) may be increased as denoted by $A_0$ and $B_0$ in FIG. 3(b), and the diode of the dummy block $B_0$ may be shielded by a top electrode or the like so that no light may be introduced into this diode. In this method, at first, a driving pulse from the dummy driving circuit $A_0$ is supplied to the dummy optical/electrical conversion circuit $B_0$, and thereafter, the true (operative) optical/electrical conversion circuits $B_1$ to $B_{40}$ are driven from the true driving circuit $A_1$ to $A_{40}$. Then, it is made possible to have the noise in the signal processing circuits retained in the sample-and-hold circuits $20_1$ to $20_n$ for noise cancellation, in the same manner as in the above described arrangement, together with dark currents in the optical/electrical conversion elements. According to this method, a merit can be obtained that the need for the complex operation can be eliminated at the time of reading, simply by forming the dummy driving circuit $A_0$ and the dummy optical/electrical conversion circuit $B_0$ simultaneously with formation of the plurality of driving circuits $A_1$ to $A_{40}$ and optical/electrical conversion circuits $B_1$ to $B_{40}$. Further, with this arrangement, the drift of the dark currents in the optical/electrical conversion elements due to temperature change and the like can be canceled.

Figure 2:
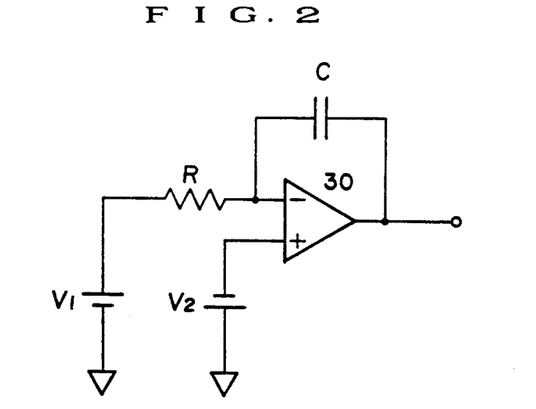
FIG. 2 is a circuit diagram of an integrating circuit arranged for checking noise reducing effects.

FIG. 2 is a circuit arranged for confirming the improvement achieved by means of the circuit of the present invention in the output offset voltage of the integrating circuits $18_1$ to $18_n$, which output offset voltage is greatly responsible for fluctuations in the noise among the output channels of the signal processing circuits $C_1$ to $C_n$. The circuit is an ordinary integrating circuit formed of an operational amplifier 30, a resistor R, and a capacitor C. The resistor R is supplied with a voltage $V_1$ as the output offset voltage of the preamplifier and the noninverting input terminal of the operational amplifier 30 is supplied with a voltage $V_2$ as the input offset voltage of the integrating circuit.

When elements of the integrating circuit are so that $R=5$ k$\Omega$, $C=150$ pF, $V_1=10$ mV, and $V_2=-10$ mV and the integrating time is set to 60 $\mu$ sec, the output offset voltage of the integrating circuit when the circuit of FIG. 1 was not used was approximately $-1.7$ V. In contrast with this, when the circuit of FIG. 1 was used under the same conditions, the output offset voltage of the integrating circuit became lower than 20 mV. Assuming that the net image signal was 1 V, the above results mean that the S/N ratio was improved from 4.6 dB to 34 dB.

If the noise can be reduced to such a degree, there appears no noise at intervals of the period corresponding to the number of the output channels in the serial image signal that is finally output as the signal from the image sensor apparatus and, hence, no change in concentration is produced in the obtained image. Further, even a compact-type image sensor which reads an image using relatively low levels of light so that there is a relatively high noise level, can provide an image signal with a sufficiently high S/N ratio.

Figure 5:
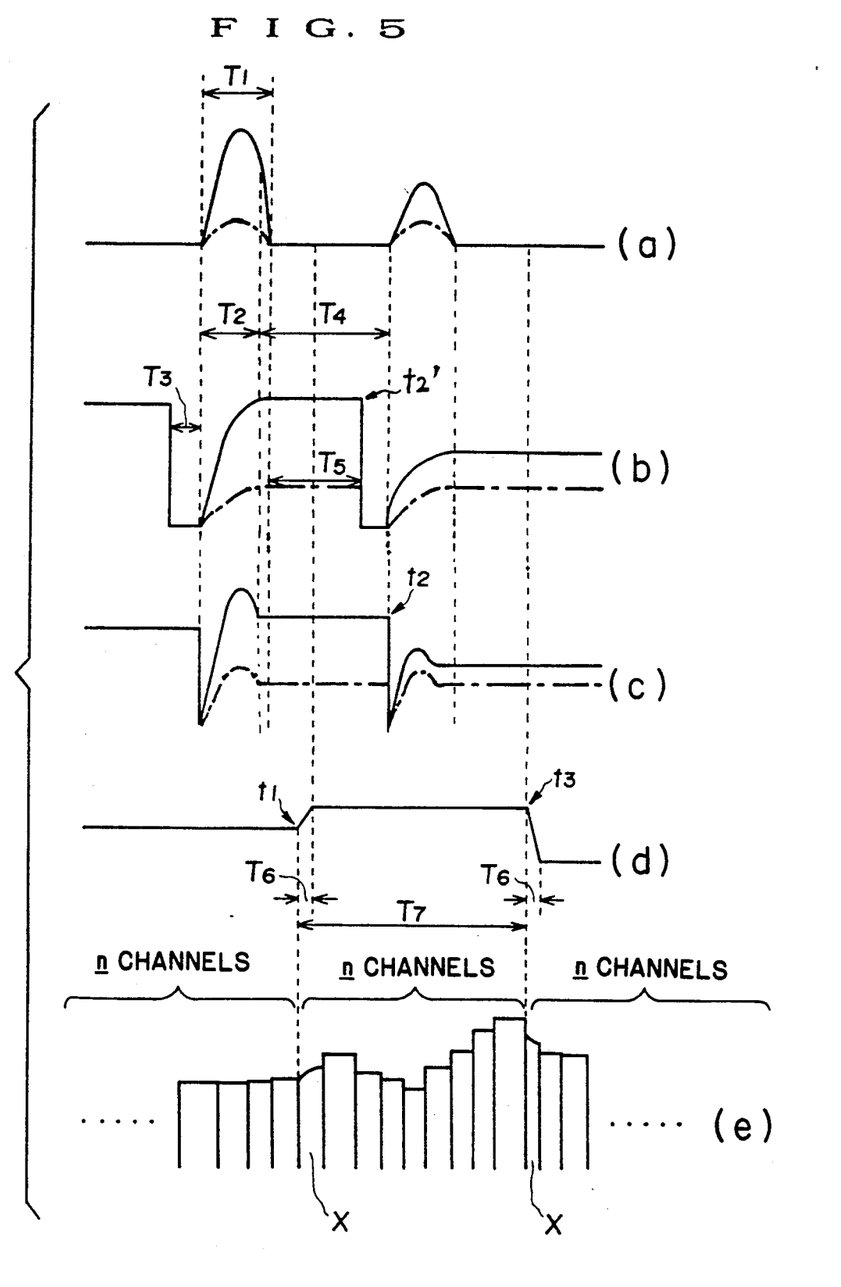
FIG. 5 provides waveform diagrams in various points in the signal processing circuit shown in FIG. 1.

FIG. 5 shows waveform diagrams at various points in the signal processing circuit shown in FIG. 1. Diagram (a) shows the waveform of the output signal of the preamplifier at point A in the signal processing circuit of FIG. 1. Diagram (b) shows the waveform of the output signal of the integrating circuit at the point B in the signal processing circuit. Diagram (c) shows the waveform of the output signal of the sample-and-hold circuit, when a sample-and-hold circuit is used in place of the above integrating circuit, at the point B of the signal processing circuit. Diagram (d) shows the waveform diagram of the output signal of the sample-and-hold circuit at the point C of the signal processing circuit of FIG. 1. Diagram (e) shows the waveform of the serial signal output from the multiplexer at the point D of the signal processing circuit.

Referring to FIG. 1, the input terminals $14_1$ to $14_n$ are supplied with the image signals from the photodiodes and these signals are amplified by the preamplifiers $16_1$ to $16_n$. Such a signal is shown in diagram (a) of FIG. 5. The amplified signal is turned into the waveform as shown in diagram (b) of FIG. 5 by means of the integrating circuits $18_1$ and $18_n$. It is possible to use sample-and-hold circuits in place of the integrating circuits $18_1$ to $18_n$, in which case, the sampling is made during the period $T_2$ and, thereafter, the value is maintained during a predetermined period $T_4$ as shown in diagram (c) of FIG. 5. The quantity of electric charges taken out from the photodiode correspond to the area enclosed by the signal in diagram (a) of FIG. 5, and therefore, when it is desired to obtain a signal corresponding to the quantity of electric charge, the integrating circuit is used.

The waveforms shown in diagrams (a), (b), and (c) of FIG. 5 respectively include noise waveforms indicated by the chain lines. These noise signals, however, are retained in the sample-and-hold circuits $20_1$ to $20_n$ as output signals before actual reading operations are performed on the optical/electrical conversion elements, as described above, and they are removed from the parallel output signals from the optical/electrical conversion elements in the subtractor circuits $22_1$ to $22_n$.

In the circuit of the present embodiment, there are provided the sample-and-hold circuits $24_1$ to $24_n$ as the second signal retaining means provided to the rear of the integrating circuits $18_1$ to $18_n$ which form the first signal retaining means. The sample-and-hold circuits $24_1$ to $24_n$ start the signal retaining operation at a point of time $t_1$ while the integrating circuits $18_1$ to $18_n$ are retaining constant values. At this time, the time duration $T_6$ which is taken by the sample-and-hold circuits $24_1$ to $24_n$ in the rear stage before they again output constant values is extremely short, for example, 0.3 to 0.4 $\mu$ sec. This is because they need not wait until the charges stored on the photodiode are taken out during the period $T_2$ as with the integrating circuits $18_1$ to $18_n$ in the front stage and also because the output signals of the integrating circuits $18_1$ to $18_n$ in the front stage are constant.

The sample-and-hold circuits $24_1$ to $24_n$ in the rear stage retains those values until the point of time $t_3$, when the next sampling is started. Before this point of time, the integrating circuits $18_1$ to $18_n$ in the front stage are once reset at the point of time $t_2'$ and start integrating operations on the image signals when they are sent over, then, from the photodiodes of the image sensor. This does not at all affect the signals retained in the sample-and-hold circuits $24_1$ to $24_n$ in the rear stage. Hence, the sample-and-hold circuits $24_1$ to $24_n$ in the rear stage continue to retain their values.

The multiplexer 26 electrically switches and outputs the values retained in the sample-and-hold circuits $24_1$ to $24_n$ of the respective channels in predetermined sequence. The interval between the switching operations is preset to be the period obtained by having the period $T_7$ from the time $t_1$ to the time $t_3$ in diagram (d) of FIG. 5 divided by the number n of the channels. This period becomes the interval during which the signal for one pixel of the image signal is output from the output terminal 28 of the multiplexer 26. To be concrete, this interval is, for example, 1 $\mu$sec.

In reality, the period indicated by $T_6$ in diagram (d) of FIG. 5 is required in the sample-and-hold operation of the sample-and-hold circuits $24_1$ to $24_n$ in the rear stage also as the sampling period. This period is approximately 0.3 to 0.4 $\mu$sec and the signal X output from the multiplexer 26 first reaches the peak value only after this period has passed. However, this period is sufficiently smaller than the interval of the signal for one pixel which is 1 $\mu$sec as described above. Therefore, although the waveform of the signal X output at first becomes somewhat drooping as shown in FIG. 5(e), this distortion in the waveform presents no problem as long as the signals handled as image signal.

As to the signals output from the multiplexer 26, as soon as the serial signal from one sequence of n channels has been output, the serial signal for the next sequence of n channels is output as shown in diagram (c) of FIG. 5, because of the provision of the sample-and-hold circuits $24_1$ to $24_n$ in the rear stage, i.e., there is no momentary loss of signal between the serial signal for one sequence of nine channels and the serial signal for the next sequence of nine channels.

Figure 6:
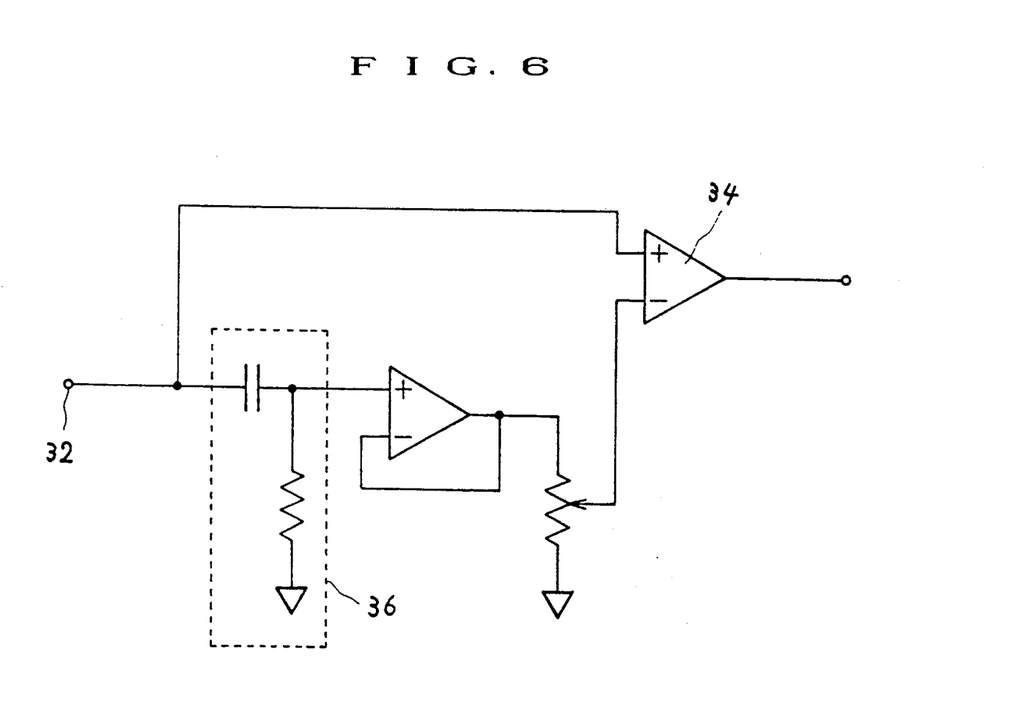
FIG. 6 is a circuit diagram of a binarization circuit.

The serial signal output from the output terminal 28 is binarized by means of a circuit, for example, as shown in FIG. 6. This circuit supplies the serial image signal input to the terminal 32 to a comparator 34 and, at the same time, supplies a portion of the signal to a low-pass filter 36. The low-frequency signal passed through the low-pass filter 36 is supplied to the other terminal of the comparator 34. Thus, the threshold value for comparison is successively changed by the low-frequency signal passed through the low-pass filter 36 and the signal is thereby binarized.

Now, if it is assumed that a serial signal, containing a momentary loss of signal between the serial signal for a sequence of nine channels and the serial signal for the next sequence of nine channels, is input to the circuit of FIG. 6, then the signal passed through the low-pass filter, i.e., the threshold value for the binarization, greatly varies and it becomes impossible to obtain a correctly binarized image signal. Therefore, when such a signal including a signal dropout is to be binarized, it becomes necessary to have the signal once digitized by an A/D converter and stored into a memory and then have the digitized signal subjected to a certain process. However, if the signal is one which does not include a dropout as shown in diagram (e) of FIG. 5, the signal need not be subjected to such a process but can be turned into a high quality binarized image signal by the use of the simple binarization circuit shown in FIG. 6.

Although, in the above-described embodiment, the case where integrating circuits or sample-and-hold circuits were used as the signal retaining means was explained, the present invention is not limited to such an arrangement, but can use other circuits functioning similarly to these circuits. It is even possible to omit the preamplifier and the first and second signal retaining means. Thus, the embodiments described herein are given by way of illustration only and not limitative of the present invention. The scope of the invention is defined by the appended claims and all changes and modifications as fall within the equivalence of the scope of the claims are therefore to be embraced by the invention.

What is claimed is:

1. An image sensor apparatus comprising:
   a plurality of optical/electrical conversion elements connected to form a matrix array;
   switching elements, provided for each of said conversion elements, for taking out electric charges stored on said conversion elements;
   driving means for driving said plurality of switching elements in parallel, thereby taking out image signals from said conversion elements in parallel;
   amplifying means for amplifying the image signals in parallel to obtain amplified image signals;
   noise signal retaining means, provided on an output side of said amplifying means, said noise signal retaining means connected to form a matrix array for temporarily retaining in parallel, as noise signals, signals output by said amplifying means while said conversion elements are not being driven;
   subtracting means for subtracting in parallel the noise signals retained in said noise signal retaining means from the amplified image signals;
   sample and hold means for temporarily retaining in parallel the signals output from said subtracting means; and
   means for converting signals retained in parallel by said output signal retaining means into a serial signal in predetermined sequence.

2. An image sensor apparatus according to claim 1, further comprising an integrating means, provided on the output side of said amplifying means and on input sides of said noise signal retaining means and said subtracting means, so that the noise signals are integrated before being retained by said noise signal retaining means and so that the amplified image signals are integrated before being received by said subtracting means.

3. An image sensor apparatus comprising:
a plurality of operative optical/electrical conversion elements connected by output lines to form a matrix array;
switching elements provided for each of the operative conversion elements for taking out electric charges stored on said operative conversion elements;
driving means for driving said plurality of switching elements thereby to take out in parallel on said output lines image signals from said operative conversion elements;
a plurality of dummy optical/electrical conversion elements, provided for each of the output lines with which said operative conversion elements are connected, for detecting dark currents;
a plurality of dummy switching elements, provided for each of said dummy conversion elements, for taking out dark currents from said dummy conversion elements;
dummy driving means for driving said dummy switching elements thereby to take out in parallel the dark currents from said dummy conversion elements;
noise signal retaining means for temporarily retaining in parallel, as noise signals, the dark currents taken out from said dummy conversion elements by said dummy driving means;
subtracting means for subtracting in parallel the noise signals retained in said noise signals retaining means from the image signals taken out of said operative conversion elements; and
means for converting parallel output signals of said subtracting means into a serial signal in predetermined sequence.

4. An image sensor apparatus according to claim 3, further comprising
amplifying means for amplifying the image signals in parallel to obtain amplified image signals, said noise signal retaining means provided on an output side of said amplifying means, said subtracting means subtracting in parallel the noise signals retained in said noise signal retaining means from the amplified image signals; and
means for temporarily retaining in parallel the signals output by said subtracting means.

5. An image sensor apparatus comprising:
a plurality of optical/electrical conversion elements connected to form a matrix array;
switching elements provided for each of said conversion elements for taking out electric charges stored on said conversion elements;
driving means for driving said plurality of switching elements in parallel, thereby taking out image signals from said conversion elements in parallel;
amplifying means for amplifying the image signals in parallel to obtain amplified image signals;
signal retaining means for temporarily retaining the amplified image signals in parallel;
noise signal retaining means, connected in a matrix array on an output side of said amplifying means, for temporarily retaining in parallel, as noise signals, signals output by said amplifying means while said conversion elements are not being driven;
subtracting means for subtracting in parallel the noise signals retained in said noise signal retaining means from the amplified image signals retained in said signal retaining means;
sample and hold means for temporarily retaining in parallel signals output from said subtracting means; and
means for converting the signals retained in said sample and hold means into a serial signal in predetermined sequence.

* * * * *